United States Patent
Kuroda

(10) Patent No.: US 7,480,507 B2
(45) Date of Patent: Jan. 20, 2009

(54) MOBILE COMMUNICATION TERMINAL, MOBILE COMMUNICATION SYSTEM, AND ROAMING CONNECTION METHOD

(75) Inventor: Kei Kuroda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 365 days.

(21) Appl. No.: 11/298,714

(22) Filed: Dec. 12, 2005

(65) Prior Publication Data

US 2006/0178144 A1    Aug. 10, 2006

(30) Foreign Application Priority Data

Feb. 7, 2005  (JP)  ............... 2005-030782

(51) Int. Cl.
  *H04Q 7/20* (2006.01)
(52) U.S. Cl. .................... 455/433; 455/456.1
(58) Field of Classification Search ............. 455/435.1, 455/435.3, 433, 432.1
  See application file for complete search history.

(56) References Cited

U.S. PATENT DOCUMENTS

| 5,787,347 A | 7/1998 | Yu et al. |
| 6,058,309 A | 5/2000 | Huang et al. |
| 7,089,001 B2 * | 8/2006 | Leung et al. ............... 455/433 |
| 2003/0134637 A1 * | 7/2003 | Cooper ....................... 455/432 |
| 2005/0282489 A1 * | 12/2005 | Kamdar et al. ............. 455/3.02 |

FOREIGN PATENT DOCUMENTS

| CN | 1685755 A | 10/2005 |
| EP | 0 836 340 A2 | 4/1998 |
| JP | 5-63640 | 3/1993 |
| WO | WO 2004/014101 A2 | 2/2004 |

* cited by examiner

*Primary Examiner*—Duc Nguyen
*Assistant Examiner*—Dai A Phuong
(74) *Attorney, Agent, or Firm*—Oblon, Spivak, McClelland, Maier & Neustadt, P.C.

(57) ABSTRACT

When a cell phone attempts a roaming connection, it is connected to a roamed mobile communication network, without need for user's effort to perform a connection operation. When a home mobile communication network managed by a telecommunications carrier in contract with the user of the cell phone receives location registration information indicating that the cell phone has registered a location with the roamed mobile communication network, it transmits to the cell phone, priority access point information containing information about roamed mobile communication networks providing a packet communication service. The cell phone searches the roamed mobile communication networks and requests location registration with a roamed mobile communication network contained in the access point information received from the home mobile communication network.

7 Claims, 6 Drawing Sheets

Fig.2

| SUBSCRIBER NUMBER | VISITED COUNTRY CODE | VISITED CARRIER CODE | CONTRACTUAL CONTENT |
|---|---|---|---|
| 123456 | 111 | 04 | ○○○ |
| 789123 | 222 | 01 | △△△ |
| ... | ... | ... | ... |

Fig.3

| COUNTRY CODE | FIRST PRIORITY CARRIER CODE | SECOND PRIORITY CARRIER CODE | ... |
|---|---|---|---|
| 111 | 04 | 01 | ... |
| 222 | 01 | - | ... |
| ... | ... | ... | ... |

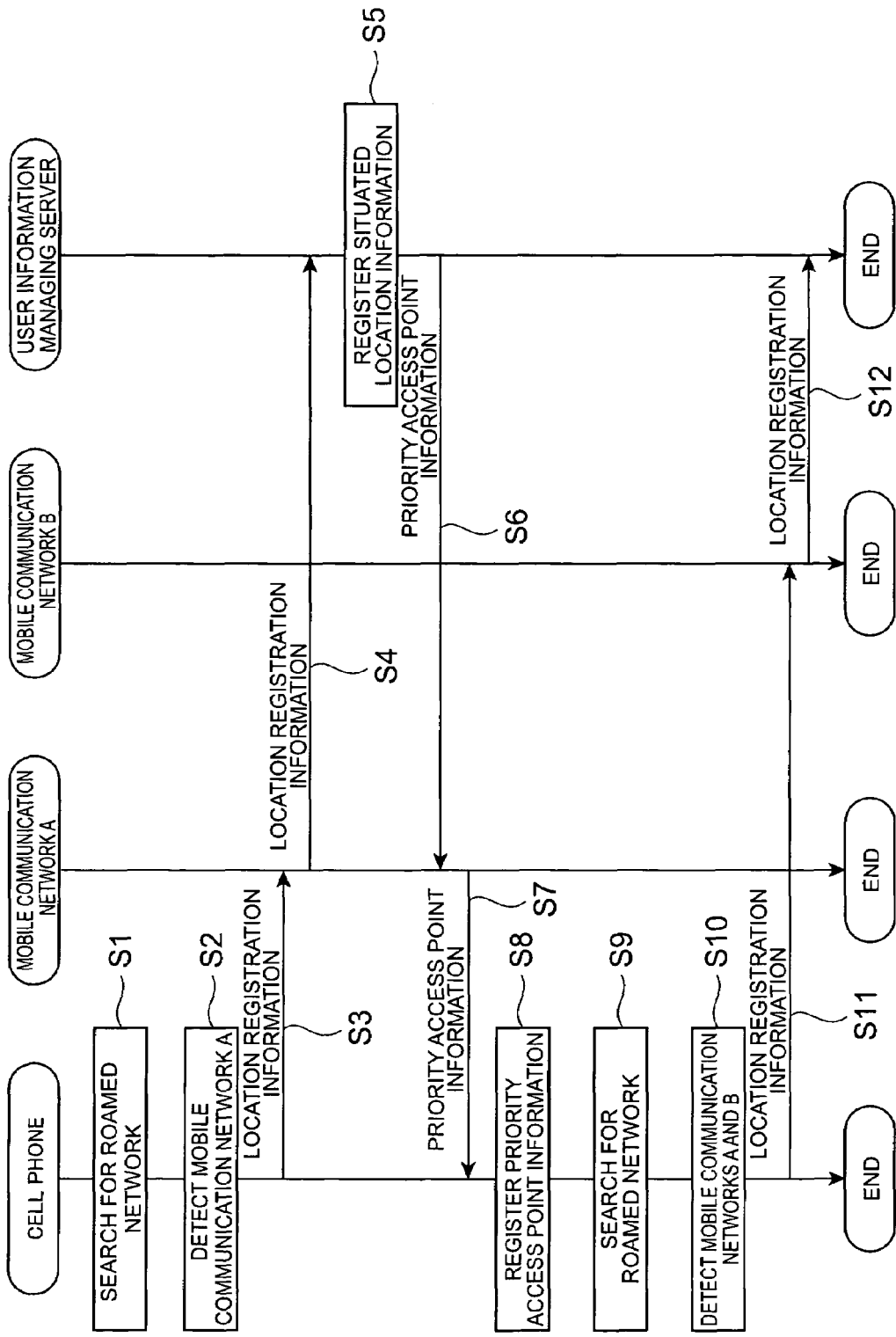

MOBILE COMMUNICATION TERMINAL, MOBILE COMMUNICATION SYSTEM, AND ROAMING CONNECTION METHOD

BACKGROUND OF THE INVENTION

1. Field of the Invention

The present invention relates to a mobile communication terminal to receive a roaming service, a mobile communication system for providing a roaming service for the mobile communication terminal, and a roaming connection method.

2. Related Background of the Invention

In recent years, roaming services are provided for mobile communication terminals typified by cell phones. The roaming service is a service for providing a variety of communication services provided by a telecommunications carrier in contract with a user (hereinafter also referred to as a home carrier), for the user by use of communication facilities of another telecommunications carrier (hereinafter also referred to as a roamed carrier) affiliated with the home carrier. For example, when a user in contract with a Japanese telecommunications carrier uses an international roaming service in a foreign country, the user receives various communication services provided by the Japanese telecommunications carrier in contract with the user, through the use of communication facilities of a telecommunications carrier in the foreign country. Such technology about the roaming service is disclosed, for example, in Patent Document 1 (Japanese Patent Application Laid-Open No. 5-63640).

SUMMARY OF THE INVENTION

Incidentally, services provided by telecommunications carriers differ depending upon the telecommunications carriers. Specifically, for example, the presence/absence of the packet communication service, discount rates of service charges, the range of coverage, etc. differ among the telecommunications carriers. Therefore, for example, there are cases wherein the packet communication is available in a mobile communication network managed by the home carrier (hereinafter also referred to as a home network), whereas the packet communication is not available in a mobile communication network managed by a roamed telecommunications carrier (hereinafter also referred to as a roamed network). In such cases, the user needs to select a roamed network where the packet communication is available, from a plurality of roamed networks by himself or herself, and to connect the mobile communication terminal to the selected roamed network. Namely, the user himself or herself has to select the roamed network where the packet communication is available, in order to connect the mobile communication terminal to the roamed network. As described above, the user had to select the roamed network by himself or herself in accordance with the contents of the services provided by the telecommunications carriers and to connect the mobile communication terminal to the selected network, with need for user's effort to perform the connection operation.

In order to solve the above problem, an object of the present invention is therefore to provide a mobile communication terminal, a mobile communication system, and a roaming connection method for permitting the mobile communication terminal to achieve a roaming connection to a roamed network, without need for user's effort to perform a connection operation.

A mobile communication terminal according to the present invention is a mobile communication terminal capable of roaming connection, comprising: access point information receiving means for receiving access point information containing information about roamed mobile communication networks, from a home mobile communication network of a telecommunications carrier in contract with a user of the host terminal; searching means for searching the roamed mobile communication networks; and location registration requesting means for attempting a request for location registration in order from the roamed mobile communication networks contained in the access point information received by the access point information receiving means, among the roamed mobile communication networks detected by the searching means.

According to the present invention, the access point information receiving means receives the access point information containing the information about the roamed mobile communication networks, the searching means searches the roamed mobile communication networks, and the location registration requesting means attempts a location registration request while selecting a target in order from the roamed mobile communication networks contained in the access point information received by the access point information receiving means, among the roamed mobile communication networks detected by the searching means. Therefore, the user of the mobile communication terminal is able to connect the mobile communication terminal to the roamed mobile communication network designated by the home mobile telecommunications carrier, without need for the user himself or herself to perform the connection operation upon the roaming connection.

In the mobile communication terminal of the present invention, preferably, the access point information is transmitted from the home mobile communication network when the mobile communication terminal has registered a location with one of the roamed mobile communication networks.

This permits the home mobile communication network to securely identify a visited country where the mobile communication terminal exists, and to transmit only the access point information about the visited country to the mobile communication terminal, whereby the mobile communication terminal can receive only the access point information about the visited country where the mobile communication terminal exists. This enables more effective utilization of communication resources.

In the mobile communication terminal of the present invention, preferably, the access point information contains priority levels in connection designated for the respective roamed mobile communication networks, and the location registration requesting means attempts a request for location registration in accordance with the priority levels designated in the access point information.

This permits the mobile communication terminal to be connected to the roamed mobile communication network in accordance with the priority levels designated by the telecommunications carrier of the home mobile communication network.

In the mobile communication terminal of the present invention, preferably, the searching means searches the roamed mobile communication networks every time the access point information receiving means receives the access point information, or, preferably, the searching means searches the roamed mobile communication networks at predetermined time intervals.

In this configuration, even if a roamed network in connection is one not providing a desired service, the mobile communication terminal can be readily re-connected to a roamed network capable of providing the service in better condition.

A mobile communication system according to the present invention is a mobile communication system comprising a mobile communication terminal capable of roaming connection, a home mobile communication network managed by a telecommunications carrier in contract with a user of the mobile communication terminal, and roamed mobile communication networks managed by other telecommunications carriers affiliated with the telecommunications carrier in contract with the user, wherein the home mobile communication network comprises: location registration information receiving means for receiving location registration information indicating that the mobile communication terminal has registered a location with one of the roamed mobile communication networks; and access point information transmitting means for transmitting access point information containing information about the roamed mobile communication networks, to the mobile communication terminal corresponding to the location registration information received by the location registration information receiving means, and wherein the mobile communication terminal comprises: access point information receiving means for receiving the access point information; searching means for searching the roamed mobile communication networks; and location registration requesting means for attempting a request for location registration in order from the roamed mobile communication networks contained in the access point information received by the access point information receiving means, among the roamed mobile communication networks detected by the searching means.

Furthermore, a roaming connection method according to the present invention is a roaming connection method of connecting a mobile communication terminal capable of roaming connection, to a roamed mobile communication network, comprising: the following steps carried out by a home mobile communication network of a telecommunications carrier in contract with a user of the mobile communication terminal: a location registration information receiving step of receiving location registration information indicating that the mobile communication terminal has registered a location with one of roamed mobile communication networks; and an access point information transmitting step of transmitting access point information containing information about the roamed mobile communication networks, to the mobile communication terminal corresponding to the location registration information received in the location registration information receiving step; the following steps carried out by the mobile communication terminal: an access point information receiving step of receiving the access point information; a searching step of searching the roamed mobile communication networks; and a location registration requesting step of attempting a request for location registration in order from the roamed mobile communication networks contained in the access point information received in the access point information receiving step, among the roamed mobile communication networks detected in the searching step.

According to these aspects of the invention, the location registration information receiving means receives the location registration information indicating that the mobile communication terminal has registered a location with one of the roamed mobile communication networks, and the access point information transmitting means transmits to the mobile communication terminal the access point information containing the information about the roamed mobile communication networks. Therefore, it permits the home mobile communication network to securely identify the visited country where the mobile communication terminal exists, and to transmit the access point information about the visited country to the mobile communication terminal. The access point information receiving means receives the access point information, the searching means searches the roamed mobile communication networks, and the location registration requesting means attempts the location registration request while selecting a target in order from the roamed mobile communication networks contained in the access point information received in the access point information receiving step, among the roamed networks. Therefore, the user of the mobile communication terminal is able to readily connect the mobile communication terminal to the roamed network designated by the home carrier, without need for the user himself or herself to perform the connection operation upon the roaming connection.

The mobile communication terminal, mobile communication system, and roaming connection method according to the present invention permit the mobile communication terminal to be connected to the roamed network, without need for user's effort to perform the connection operation.

BRIEF DESCRIPTION OF THE DRAWINGS

FIG. 2 is an illustration to illustrate a data configuration of HLR shown in FIG. 1.

FIG. 3 is an illustration to illustrate a data configuration of a priority access point table shown in FIG. 1.

FIG. 6 is a sequence diagram to illustrate a detailed operation of a connection process in a mobile communication system.

DESCRIPTION OF THE PREFERRED EMBODIMENTS

Figure 1:
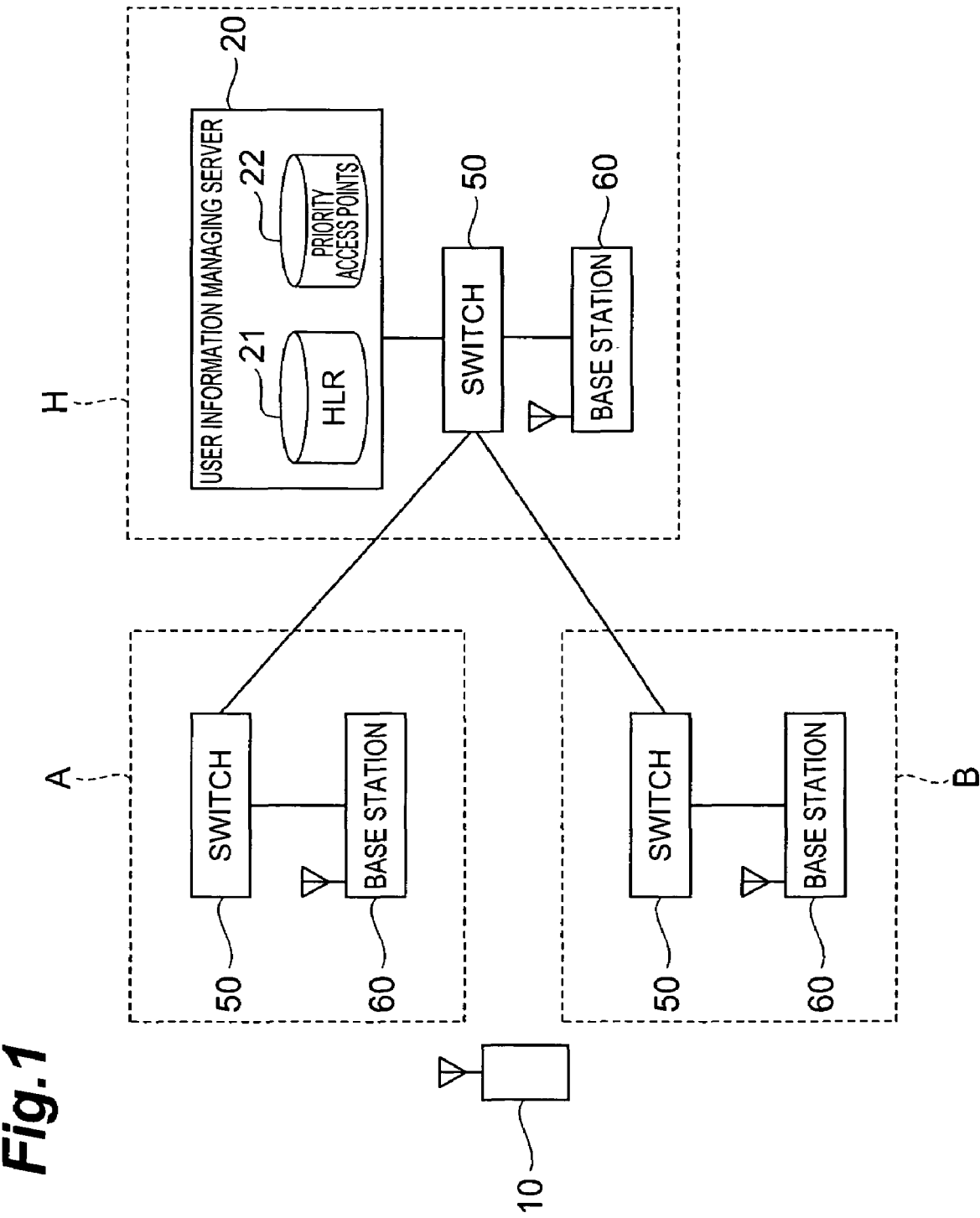
FIG. 1 is an illustration to illustrate a system configuration of a mobile communication system in an embodiment of the invention.

Embodiments of the mobile communication terminal, mobile communication system, and roaming connection method according to the present invention will be described below on the basis of the drawings. In the drawings, identical elements will be denoted by the same reference symbols, without redundant description.

FIG. 1 is an illustration to illustrate a system configuration of mobile communication system 1 in an embodiment. As shown in FIG. 1, the mobile communication system 1 has cell phone 10 (mobile communication terminal), home network H, and roamed networks A, B.

Here the home network H is a mobile communication network managed by a telecommunications carrier in contract with the user of cell phone 10. The roamed networks A, B are mobile communication networks managed by other telecommunications carriers affiliated with the telecommunications carrier in contract with the user. It is assumed in the present embodiment, for convenience' sake of description, that the home network H is a mobile communication network of a telecommunications carrier in Japan and that the roamed networks A, B are mobile communication networks of telecommunications carriers in a foreign country (e.g., USA). The roamed network A is a mobile communication network where the circuit switching communication service is available, and the roamed network B a mobile communication network where the circuit switching communication service and packet communication service are available.

The cell phone 10 is a mobile communication terminal that performs wireless communication with a base station 60 covering a radio area where the cell phone exists, and that receives a call service or a packet communication service. The cell phone 10 is physically composed of a CPU, memories such as ROM and RAM, an interface for transmission/reception of control signals to and from the outside, and so on. The mobile communication system 1 in the present embodiment is described using the cell phone 10 as a specific example of the mobile communication terminal, but the mobile communication terminal is not limited to this specific example. For example, the mobile communication terminal may be one such as a Personal Handyphone System (PHS) or a Personal Digital Assistant (PDA) with a communication function.

The home network H has user information managing server 20, switch 50, and base station 60. The switch 50 and base station 60 are the well-known switch and base station.

The user information managing server 20 is physically composed of a CPU, memories such as ROM and RAM, an external storage device such as a hard disk, an interface for transmission/reception of control signals to and from the outside, and so on. The hard disk stores HLR (Home Location Register) 21 and priority access point table 22.

The HLR 21 is a database for managing information about the situated location of cell phone 10 and others. A data configuration of HLR 21 will be described with reference to FIG. 2. HLR 21 has, for example, a subscriber number, a visited country code, a visited carrier code, and a contractual coverage as data items. The subscriber number stores a number for uniquely specifying the user of cell phone 10. The visited country code stores an ID for uniquely identifying a country where cell phone 10 exists. The visited carrier code stores an ID for uniquely identifying a telecommunications carrier managing a mobile communication network where cell phone 10 exists. The contractual coverage stores a content of a communication service or the like subscribed by the user of cell phone 10.

The priority access point table 22 is a table for managing priority access point information (access point information) about mobile communication networks to which cell phone 10 is to be preferentially connected, for each country. A data configuration of priority access point table 22 will be described with reference to FIG. 3. The priority access point table 22 has, for example, a country code, a first priority carrier code, a second priority carrier code, etc. as data items. The country code stores an ID for uniquely identifying a country where cell phone 10 exists. The first priority carrier code and the second priority carrier code store IDs for uniquely identifying telecommunications carriers of mobile communication networks. A telecommunications carrier providing the packet communication service is registered in each priority carrier code. Priority levels of respective telecommunications carriers are determined by the telecommunications carrier managing the home network H. The higher the priority level, the earlier the order in which cell phone 10 attempts a request for location registration to the associated mobile communication network. For example, let us specifically explain the contents of the priority access point information about a foreign country having the roamed networks A, B shown in FIG. 1. The first priority carrier code stores an ID for uniquely identifying the telecommunications carrier of the roamed network B, and the second priority carrier code and the codes thereafter store no telecommunications carrier code.

Figure 4:
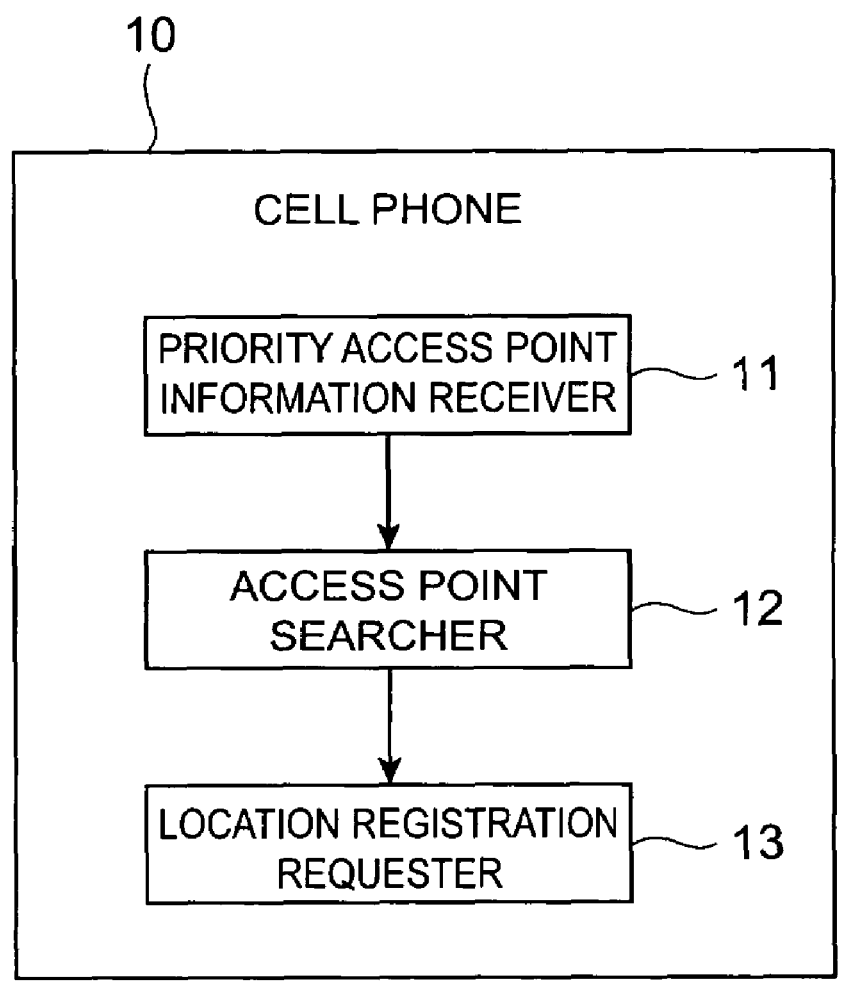
FIG. 4 is a block diagram to illustrate a functional configuration of a cell phone shown in FIG. 1.

Next, a functional configuration of cell phone 10 will be described with reference to FIG. 4. As shown in FIG. 4, cell phone 10 has priority access point information receiving part 11 (access point information receiving means), access point searching part 12 (searching means), and location registration requesting part 13 (location registration requesting means).

The priority access point information receiving part 11 receives from the home network H, the priority access point information containing information about roamed network B providing the packet communication service. This priority access point information is transmitted from the home network H when the cell phone 10 has registered a location with one of roamed networks A, B. The priority access point information received by the priority access point information receiving part 11 is stored into a memory in the cell phone 10.

The access point searching part 12 searches the roamed networks A, B. The access point searching part 12 searches the roamed networks every time the priority access point information receiving part 11 receives the priority access point information.

A method of searching the roamed networks will be specifically described below. First, the access point searching part 12 sequentially scans frequencies in a predetermined range to acquire broadcast information transmitted from the roamed networks A, B. Next, the access point searching part 12 extracts (or detects) information about the roamed networks A, B corresponding to the broadcast information thus acquired, as candidates for location registration.

The location registration requesting part 13 attempts a request for location registration while prioritizing the roamed network B contained in the priority access point information received by the priority access point information receiving part 11, over the roamed network A among the roamed networks A, B extracted (or detected) by the access point searching part 12. Therefore, the location registration requesting part 13 first attempts a request for location registration with the roamed network B contained in the priority access point information. Then it attempts a request for location registration with the roamed network A only if it fails to register a location with the roamed network B.

Figure 5:
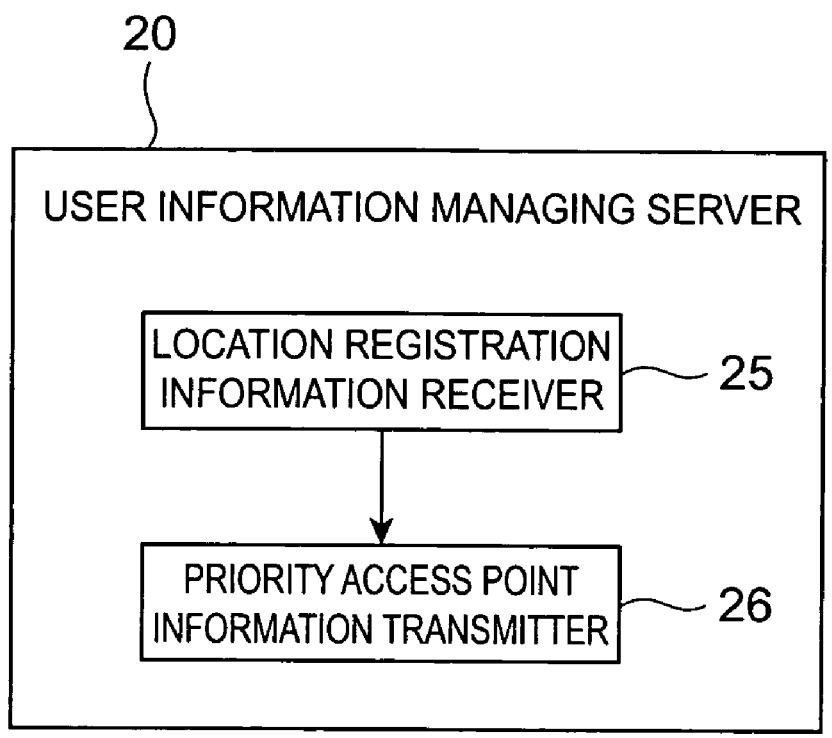
FIG. 5 is a block diagram to illustrate a functional configuration of a user information managing server shown in FIG. 1.

Next, the functional configuration of user information managing server 20 will be described with reference to FIG. 5. As shown in FIG. 5, the user information managing server 20 has location registration information receiving part 25 (location registration information receiving means) and priority access point information transmitting part 26 (access point information transmitting means).

The location registration information receiving part 25 receives location registration information transmitted when cell phone 10 requests location registration with either of the roamed networks A, B.

The priority access point information transmitting part 26 transmits to cell phone 10, the priority access point information containing the information about the roamed network B providing the packet communication service. Specifically, the priority access point information transmitting part 26 transmits, for example, a short message for control by use of the function of SMSC (Short Message Service Center), thereby transmitting the priority access point information.

The operation of the connection process in mobile communication system 1 will be described with reference to FIG. 6.

First, where the user has moved from Japan to a foreign country where the roamed network A and the roamed network B exist, the access point searching part 12 of cell phone 10 searches a mobile communication network capable of roaming connection (step S1).

Next, when the access point searching part 12 detects the roamed network A where the packet communication service is not available (step S2), the location registration requesting part 13 of cell phone 10 transmits location registration information for requesting location registration, to the roamed network A and to the user information managing server 20 of the home network H (steps S3 and S4).

Next, the location registration information receiving part 25 of user information managing server 20 receives the location registration information to register the situated location information of cell phone 10 in HLR 21 (step S5).

Next, the priority access point information transmitting part 26 of user information managing server 20 transmits to cell phone 10, the priority access point information containing the information about the roamed network B providing the packet communication service (steps S6 and S7).

Then the priority access point information receiving part 11 of cell phone 10 receives the priority access point information via the roamed network A and stores this received priority access point information into the memory in the cell phone 10 (step S8).

Then the access point searching part 12 of cell phone 10 searches for a mobile communication network capable of roaming connection (step S9). When the access point searching part 12 detects the roamed network A and the roamed network B (step S10), the location registration requesting part 13 of cell phone 10 references the priority access point information stored in the memory in cell phone 10 and transmits the location registration information for requesting location registration, to the roamed network B contained in the priority access point information and to the user information managing server 20 of the home network H (steps S11 and S12).

This permits the cell phone 10 to be connected to the roamed network B providing the packet communication service. Namely, the user of cell phone 10 is able to connect the cell phone 10 to the roamed network B providing the packet communication service, without need for the user himself or herself to perform the connection operation.

In the above embodiment only the telecommunications carriers providing the packet communication service are registered in the priority access point table 22, but the telecommunications carriers to be registered in the priority access point table 22 do not have to be limited to this example. For example, it is also possible to adopt a configuration wherein the telecommunications carriers not providing the packet communication service are also registered in addition to the telecommunications carriers providing the packet communication service, in the priority access point table 22. In this case, the priority levels of the telecommunications carriers not providing the packet communication service are set lower than those of the telecommunications carriers providing the packet communication service.

The factors for determining the telecommunications carriers and priority levels to be registered in the priority access point table 22 are not limited to whether each telecommunications carrier is one providing the packet communication service. For example, it is also possible to determine the telecommunications carriers and priority levels to be registered in the priority access point table 22, based on discount rates of service charges, the range of coverage, and so on.

In the above embodiment the access point searching part 12 is configured to search the roamed networks every time the priority access point information receiving part 11 receives the priority access point information, but the timing of searching the roamed networks does not have to be limited to this. For example, the roamed networks may be searched at predetermined time intervals. In this configuration, even if the cell phone 10 fails to be connected to the roamed network B upon reception of the priority access point information, the cell phone 10 can be connected to the roamed network B without need for the user to perform the connection operation when it becomes connectible to the roamed network B thereafter.

What is claimed is:

1. A mobile communication terminal capable of making a roaming connection, comprising:
    location registration requesting means for requesting a location registration with a first roamed mobile communication network and transmitting the location registration request to a home mobile communication network of a telecommunications carrier in contract with a user of the mobile communication terminal;
    access point information receiving means for receiving access point information from the home mobile communication network via the first roamed mobile communication network after the mobile communication terminal has requests the location registration with the first roamed mobile communication network, said access point information containing information about roamed mobile communication networks in a location of the first roamed mobile communication network;
    searching means for searching the roamed mobile communication networks in the location of the first roamed mobile communication network; and
    wherein the location registration requesting means requests a location registration with the roamed mobile communication networks in a predetermined order contained in the access point information received by the access point information receiving means, among the roamed mobile communication networks detected by the searching means.

2. The mobile communication terminal according to claim 1, wherein the access point information contains priority levels designated for the respective roamed mobile communication networks, and
    the location registration requesting means attempts a request for location registration in accordance with the priority levels designated in the access point information.

3. The mobile communication terminal according to claim 1, wherein the searching means searches the roamed mobile communication networks every time the access point information receiving means receives the access point information.

4. The mobile communication terminal according to claim 1, wherein the searching means searches the roamed mobile communication networks at predetermined time intervals.

5. A mobile communication system comprising:
    a mobile communication terminal capable of making a roaming connection;
    a home mobile communication network managed by a telecommunications carrier in contract with a user of the mobile communication terminal; and
    roamed mobile communication networks managed by other telecommunications carriers affiliated with the telecommunications carrier in contract with the user,
    wherein the home mobile communication network comprises:
    location registration information receiving means for receiving location registration information indicating that the mobile communication terminal has registered a location with a first roamed mobile communication network; and
    access point information transmitting means for transmitting access point information containing information about roamed mobile communication networks in the location of the first roamed mobile communication network, to the mobile communication terminal corresponding to the location registration information received by the location registration information receiving means, and wherein the mobile communication terminal comprises:

access point information receiving means for receiving the access point information from the home mobile communication network via the first roamed mobile communication network after the mobile communication terminal requests the location registration with the first roamed mobile communication network;

searching means for searching the roamed mobile communication networks; and location registration requesting means for requesting a location registration with the roamed mobile communication networks in a predetermined order contained in the access point information received by the access point information receiving means, among the roamed mobile communication networks detected by the searching means.

6. A roaming connection method of connecting a mobile communication terminal capable of making a roaming connection, to a roamed mobile communication network, comprising:

at a home mobile communication network of a telecommunications carrier in contract with a user of the mobile communication terminal, receiving location registration information indicating that the mobile communication terminal has registered a location with a first roamed mobile communication network, and transmitting access point information containing information about roamed mobile communication networks in the location of the first roamed mobile communication network, to the mobile communication terminal corresponding to the received location registration information; and at the mobile communication terminal, receiving the access point information from the home mobile communication network via the first roamed mobile communication network after the mobile communication terminal requests the location registration with the first roamed mobile communication network, searching the roamed mobile communication networks, and requesting a location registration from the roamed mobile communication networks in a predetermined order contained in the received access point information, among the roamed mobile communication networks detected in the searching step.

7. A mobile communication terminal capable of making a roaming connection, comprising:

a location registration requesting unit configured to request a location registration with a first roamed mobile communication network and transmitting the location registration request to a home mobile communication network of a telecommunications carrier in contract with a user of the mobile communication terminal;

an access point information receiving unit configured to receive access point information from the home mobile communication network via the first roamed mobile communication network after the mobile communication terminal requests the location registration with the first roamed mobile communication network, said access point information containing information about roamed mobile communication networks in a location of the first roamed mobile communication network;

a searching unit configured to search the roamed mobile communication networks in the location of the first roamed mobile communication network; and wherein the location registration requesting unit requests a location registration with the roamed mobile communication networks in a predetermined order contained in the access point information received by the access point information receiving unit, among the roamed mobile communication networks detected by the searching unit.

* * * * *